F. N. SANBORN & R. L. RUSSELL.
GARBAGE INCINERATOR.
APPLICATION FILED JAN. 24, 1914.

1,236,986.

Patented Aug. 14, 1917.
4 SHEETS—SHEET 1.

WITNESSES:

INVENTORS
Francis N. Sanborn
Richard L. Russell
BY
Kenyon & Kenyon
ATTORNEYS

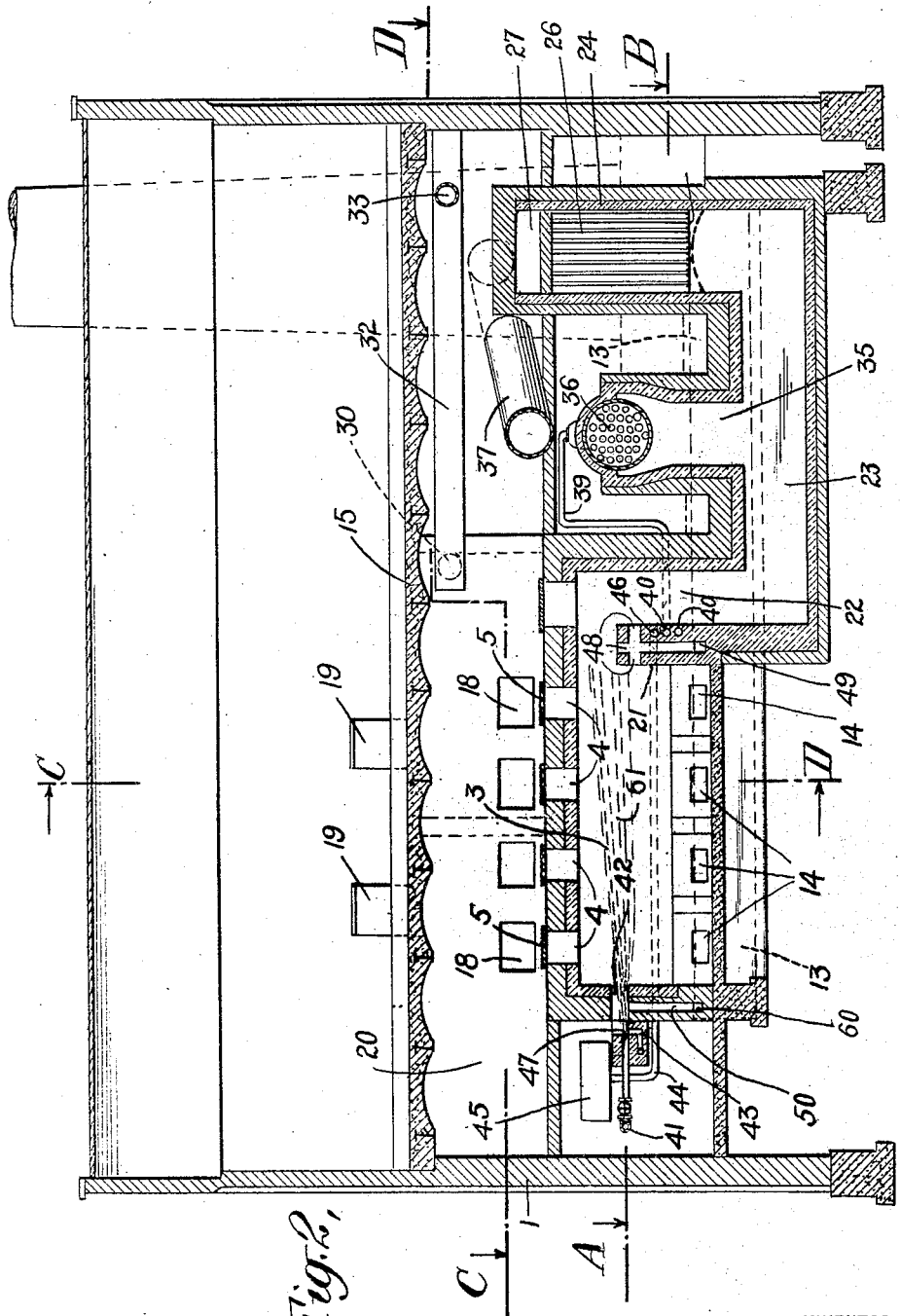

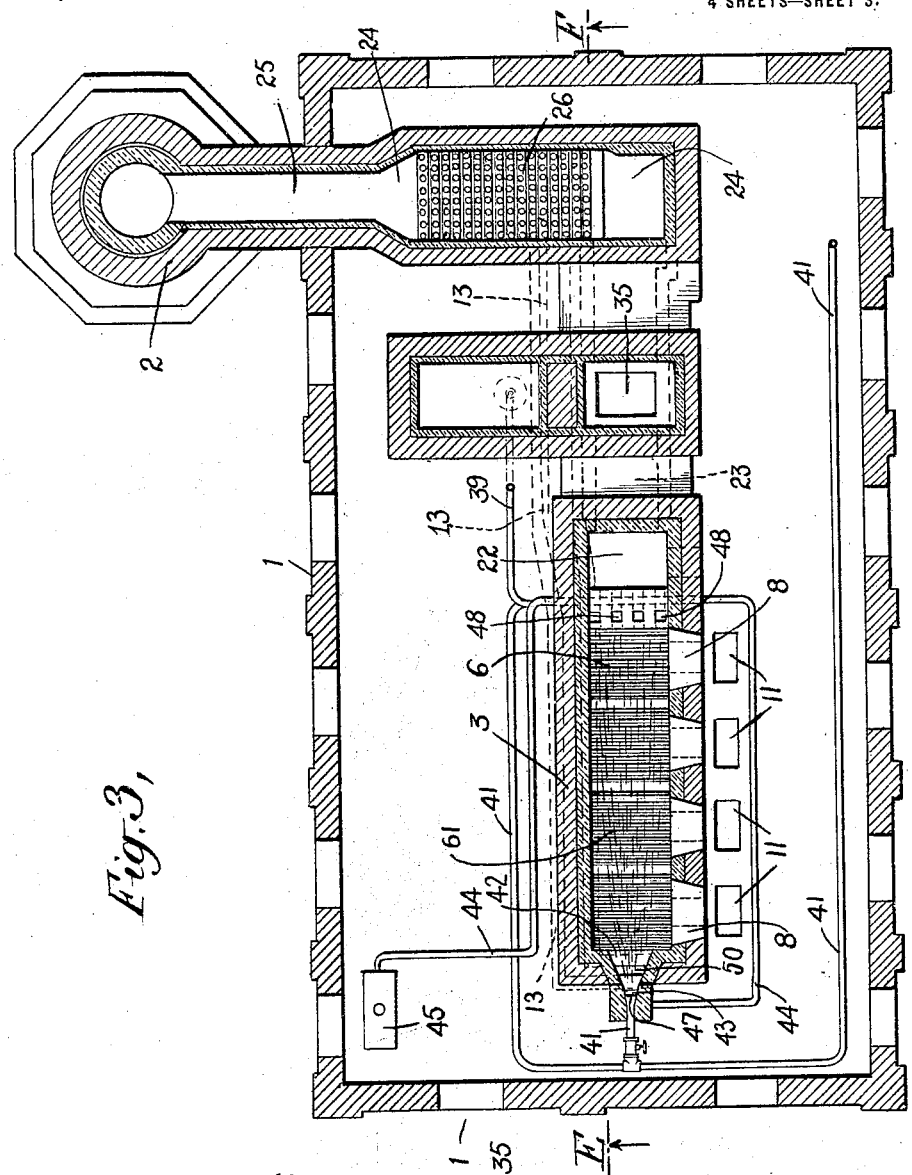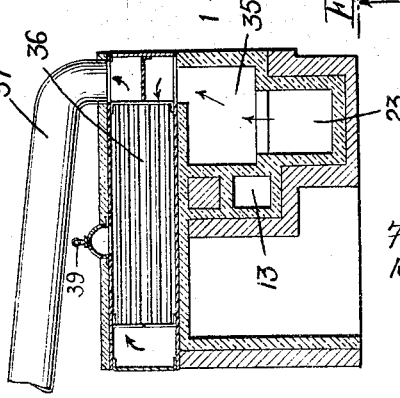

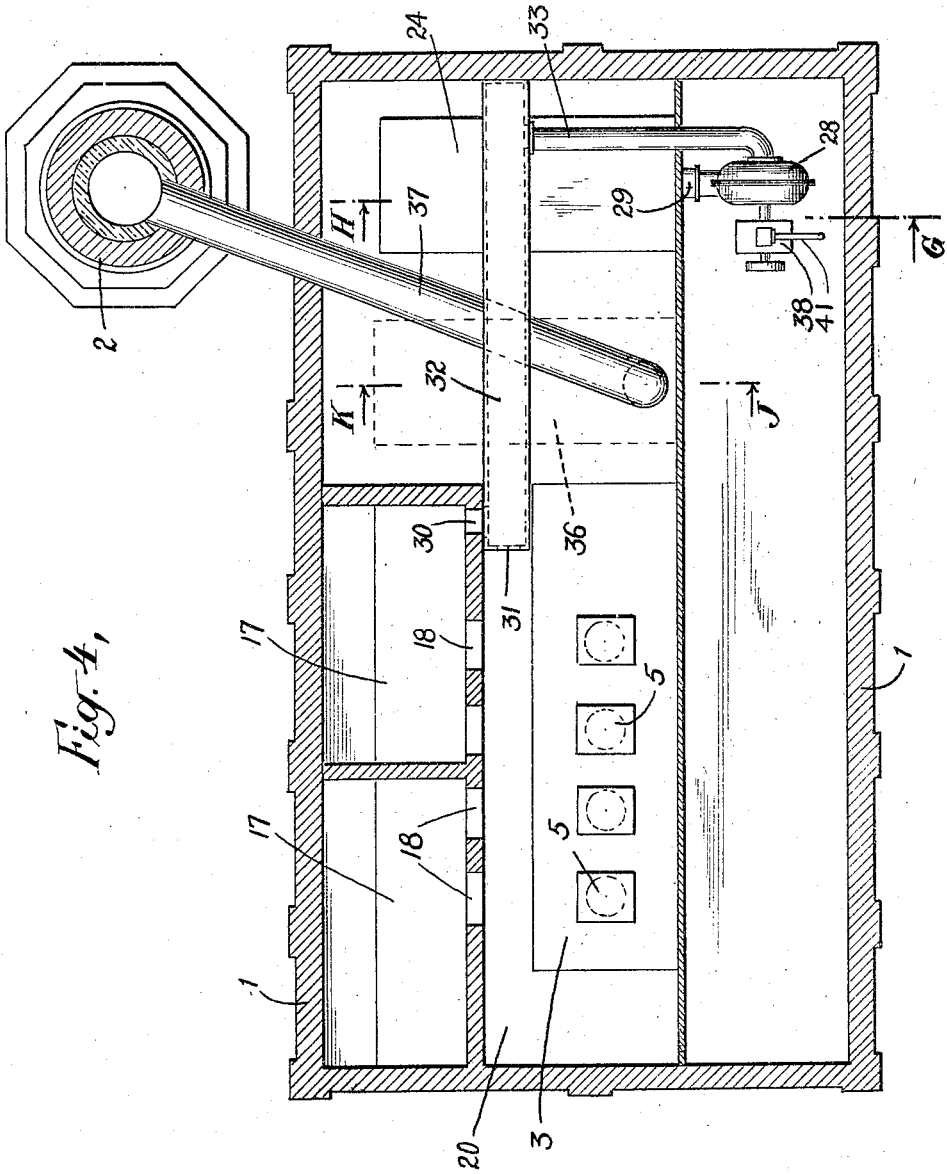

UNITED STATES PATENT OFFICE.

FRANCIS N. SANBORN AND RICHARD L. RUSSELL, OF BROOKLYN, NEW YORK, ASSIGNORS TO SANBORN-RUSSELL CONSTRUCTION COMPANY, INCORPORATED, A CORPORATION OF NEW YORK.

GARBAGE-INCINERATOR.

1,236,986.  Specification of Letters Patent.  Patented Aug. 14, 1917.

Application filed January 24, 1914. Serial No. 814,026.

*To all whom it may concern:*

Be it known that we, FRANCIS N. SANBORN and RICHARD L. RUSSELL, citizens of the United States, and residents of Brooklyn, county of Kings, State of New York, have invented certain new and useful Improvements in Garbage-Incinerators, of which the following is a specification.

The invention relates to garbage incineration and particularly to the destruction of wet refuse, although it may be applied to the destruction of other refuse matter.

One object of the invention is to produce more complete combustion of the gases and minute solid particles given off by the burning garbage. A further object of the invention is to provide an efficient arrangement for removing the contaminated air from the garbage storing or handling rooms and consuming it as far as possible as well as all odorous gases that may occur in the plant. A further object of the invention is to provide an economical and efficient arrangement for carrying out these features so as to utilize as far as possible all the energy of the plant and avoid waste. Further objects, features and advantages will more clearly appear from the detailed description given below taken in connection with the accompanying drawings which form a part of this specification and illustrate an incinerator embodying the improvements in one form. It will be understood, however, that many omissions, substitutions, additions and other changes may be made in and to the apparatus shown and described without departing from the spirit and scope of the invention in its broader aspects.

In the drawings, Figure 1 is a transverse vertical section of the incinerator plant.

Fig. 2 is a longitudinal vertical section taken on the line E—F of Fig. 1, the grate 6 being omitted.

Fig. 3 is a horizontal section taken on the line A—B of Fig. 2.

Fig. 4 is a horizontal section on the line C—D of Fig. 2.

Fig. 6 is a vertical section taken on the line J—K of Fig. 4.

Figure 1:
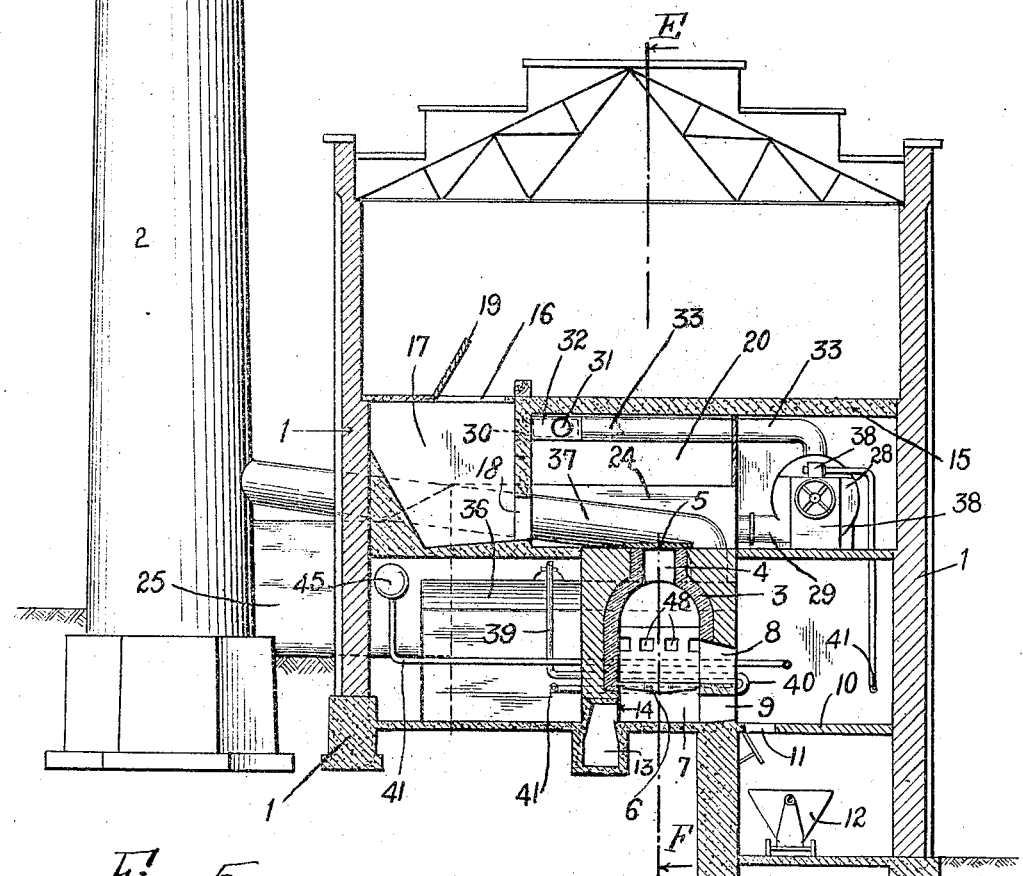
Figure 5:
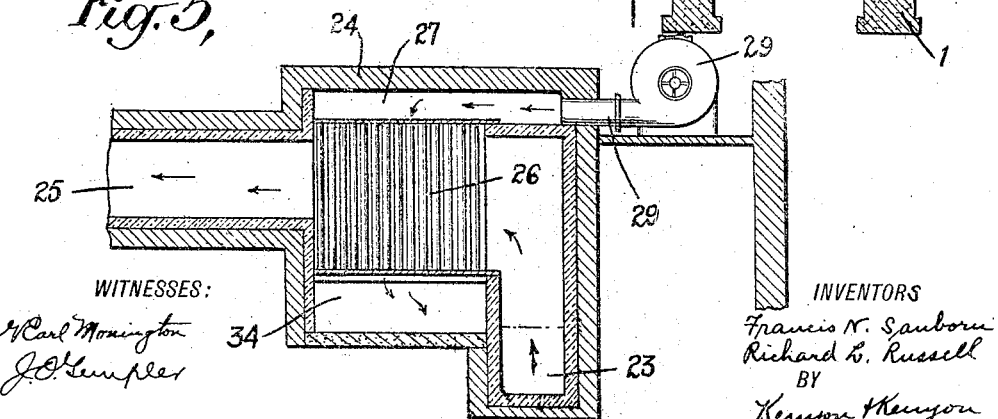
Fig. 5 is a vertical section on the line G—H of Fig. 4.

Referring to the various figures, 1 represents the building structure and 2 the stack. 3 represents an updraft reverberatory furnace provided with charging openings 4 covered by covers 5 and having grates 6 over ash pits 7. The furnace is provided with clinker and distributing doors 8 just above the grates and with ash or clinker doors 9 just below the grates for removal of the ashes, etc., to the floor 10, whence they may be shoveled through trap doors 11 into removing trucks 12. At the opposite side of the furnace is an air flue 13 connecting with the space beneath the grates 6 by means of dampered openings 14. The trucks or carts loaded with garbage are driven in upon the floor 15 and the garbage or refuse deposited through the openings 16 having doors 19 into storage spaces 17 from which it is removed as desired, through openings 18 into the handling room 20 from which it is charged into the furnace through the openings 4.

The furnace 3 is provided with an end wall 21 over the top of which the heated products of combustion pass to a further combustion chamber 22 extending downwardly to the passage 23 which leads to the bottom of a chamber 24 and thence through a passage 25 to the stack 2. Situated in the chamber 24 in the path of the products of combustion as they pass to the stack is a heat transferrer composed of a series of pipes 26 open at each end and adapted to receive air from the space 27 from a fan or blower 28 through a pipe 29. The fan or blower withdraws the contaminated air from the storage and handling spaces or rooms 17 and 20 through openings 30 and 31 in a long box 32 connected with the fan by a pipe 33. The space 34 below the preheating pipes 26 is directly connected with the air flue 13.

Leading from the passage 23 is a by-pass 35 through which part of the hot products of combustion are conducted to a fire tube boiler 36 from which the gases are led by a pipe 37 to the stack 2. The fan 28 is driven by an engine 38 which may be of the turbine type, and which receives steam from the boiler 36 through a pipe 39 which pipe has a few passes 40 in the hot front wall 21 of the furnace for superheating the steam if desired, from which passes 40 the steam is conducted to the engine by pipe 41. At the rear end of the furnace is a flared opening 42 into which is introduced a jet of combustible hydrocarbon oil. The oil is supplied by a flared nozzle 43 from a pipe 44 which leads from the oil supply tank 45 and has one or more passes 46 in the hot wall 21 for preheating the oil and increasing its fluidity. The injecting of the oil may be produced by steam or air but as shown is produced by steam from a flared nozzle 47 supplied with steam from the pipe 41, so as to produce a fan-shaped flame blanket 61 over the garbage which oil is injected longitudinally into the flame or gases over the burning garbage so as to boost the temperature of the flame. The bridge wall 21 is provided with air passages 48 for admixing air with the partly unburned products of combustion from the burning garbage to aid further combustion in the space 22. Air under pressure is supplied to the dampered passages 48 from the air flue 13 through the opening 49. In a similar manner air is supplied from the duct 13 through the passage 60 to a dampered air passage 50 in the rear wall, which admixes air with the fluid hydrocarbon as it is injected into the furnace through the opening 42.
In operation, a fire of light wood or other light combustible rubbish is first started in the furnace. The fluid hydrocarbon, preferably crude or residual oil, though we may use gas either natural or artificial, is then turned on and forced or atomized or sprayed by the air or steam pressure into the furnace. It is then ignited, either as gas or in part as liquid globules or solid particles in process of combustion and is ready to mingle with the vapors from the burning garbage and burn with the garbage, thereby boosting the temperature in the furnace. The fan being turned on so as to produce an air blast under the grates and through the passages 48 and 50, a charge of the material to be incinerated is then introduced through the openings 4 onto the preliminary fire.

This material ignites and burns down, and as the volume decreases and the depth on the grate decreases a fresh charge of the material to be incinerated is introduced onto the incandescent clinker above the supporting grate and the process continued.

The amount of the fluid hydrocarbon is regulated, so that as the clinker on the grate increases in volume and temperature, less of the fluid hydrocarbon is used; and when a fresh charge of wet material is introduced, more fluid hydrocarbon may be turned on, thus effecting economy in the use of the auxiliary fuel. When the depth of clinker above the supporting grate becomes excessive, it is removed (by the use of a hoe) through the clinkering door 8 in the walls of the furnace above the grate.

The vapors and gases and minute unconsumed particles from the burning of the material to be incinerated pass through and mingle with the incandescent hydrocarbon and over the bridge wall 21 into the combustion chamber 22, meeting in transit the additional air introduced at various portions of the bridge wall through the passages 48.

The process of combustion is completed in the combustion chamber adjacent to the furnace inclosure, and the gases pass through this into the passages 23, chamber 24, to the stack, and through the passage 35, through the boiler 36 to the stack.

It will be seen that the heat of combustion is utilized in many ways, thus making the apparatus extremely efficient and economical. The pipes and passages into the front hot bridge wall 21 not only preheat the fluid hydrocarbon before it is injected into the furnace, but also air admitted through the passages 48 is strongly heated so that it is more easy of combustion with the unconsumed products from the burning garbage.
Likewise, the steam from the boiler may be superheated from this wall. The boiler 36 also derives its heat from the products of combustion so that the energy of driving the blower 28 is likewise derived from the heat of the products of combustion. The introduction of the fluid hydrocarbon jet causes a substantially complete combustion of all minute particles that may be given off by the burning garbage and consumes the odors therefrom so that when the products of combustion issue from the stack they are not obnoxious. By using as air for the combustion, the contaminated air in the storage and handling rooms 17 and 20 the contaminated air in these rooms is continually withdrawn therefrom so as to provide fresh air therein and thus make the rooms more healthy and agreeable for the workmen. Also the same fan or blower 28 which withdraws this air from these rooms through the box 32 and pipe 33 acts to force the air through the preheating pipes 26 and to the air flue 13, thus saving energy and duplication of apparatus.

Having fully and clearly described the improvements what is claimed and desired to be secured by Letters Patent, is:

1. A garbage incinerator having in combination a furnace for burning the garbage, one or more rooms where the garbage is stored or handled, a fan or blower for withdrawing contaminated atmosphere from said room or rooms and conducting it to the furnace for combustion with the garbage, an engine for driving said fan or blower, a boiler heated by the products of combustion of the furnace, means for conducting steam from the boiler to drive said engine, and means for superheating the steam on its way to the engine by heat from the furnace.

2. A garbage incinerator having in combination a furnace for burning the garbage, one or more rooms where the garbage is stored or handled, a fan or blower for withdrawing contaminated atmosphere from said room or rooms and conducting it to the furnace for combustion with the garbage, an engine for driving said fan or blower, a boiler heated by the products of combustion of the furnace, means for conducting steam from the boiler to drive said engine, means for superheating the steam on its way to the engine by heat from the furnace, and means for injecting into the flame or gases from the garbage fluid hydrocarbon to complete the combustion of the minute solid particles contained in the products of combustion of the garbage and consume the odors from said combustion.

In testimony whereof, we have signed our names to this specification, in the presence of two subscribing witnesses.

FRANCIS N. SANBORN.
RICHARD L. RUSSELL.

Witnesses:
GORHAM CROSBY,
EDWIN SEGER.